Oct. 3, 1961 T. B. APPEL, JR 3,002,575
MULTIPLE MATERIAL BATCHER CONTROL
Filed March 5, 1956 4 Sheets-Sheet 3
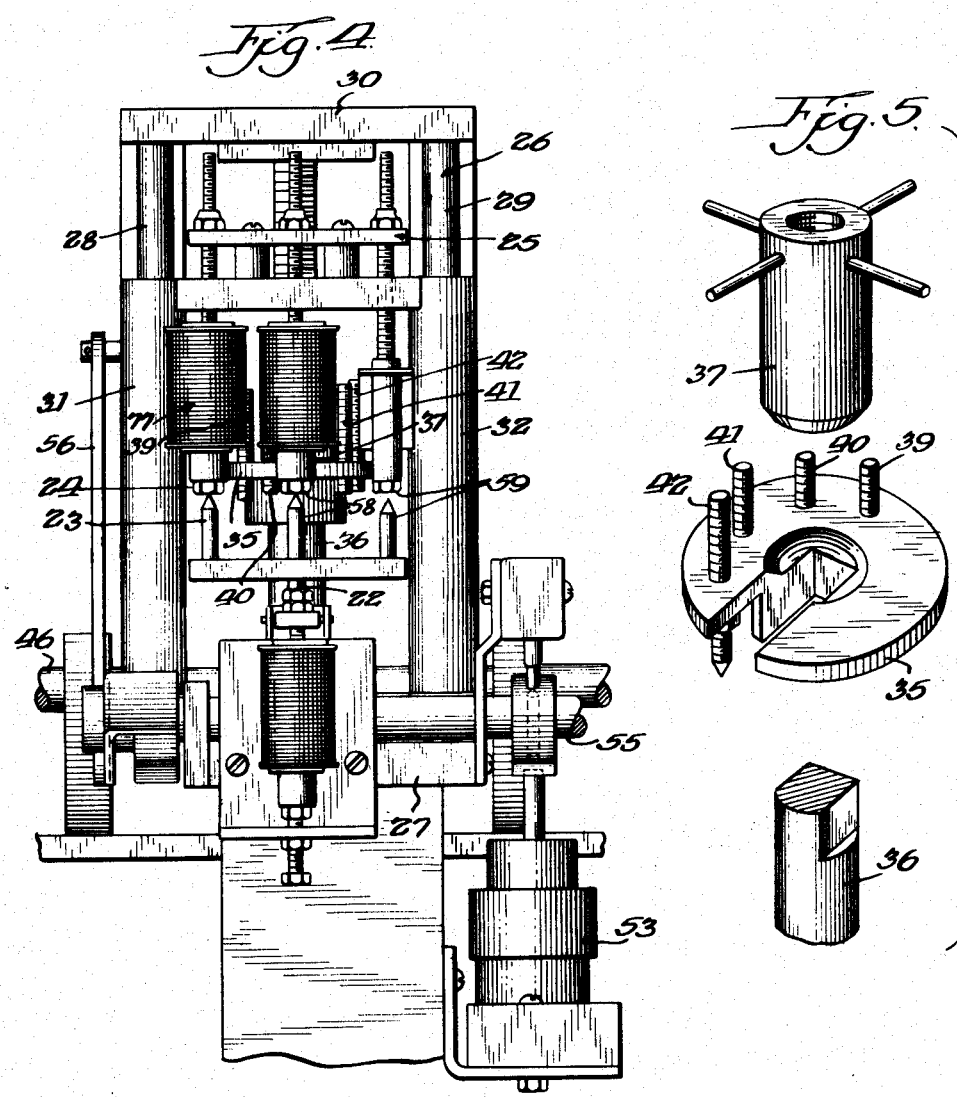
INVENTOR.
Theodore B. Appel, Jr.
BY

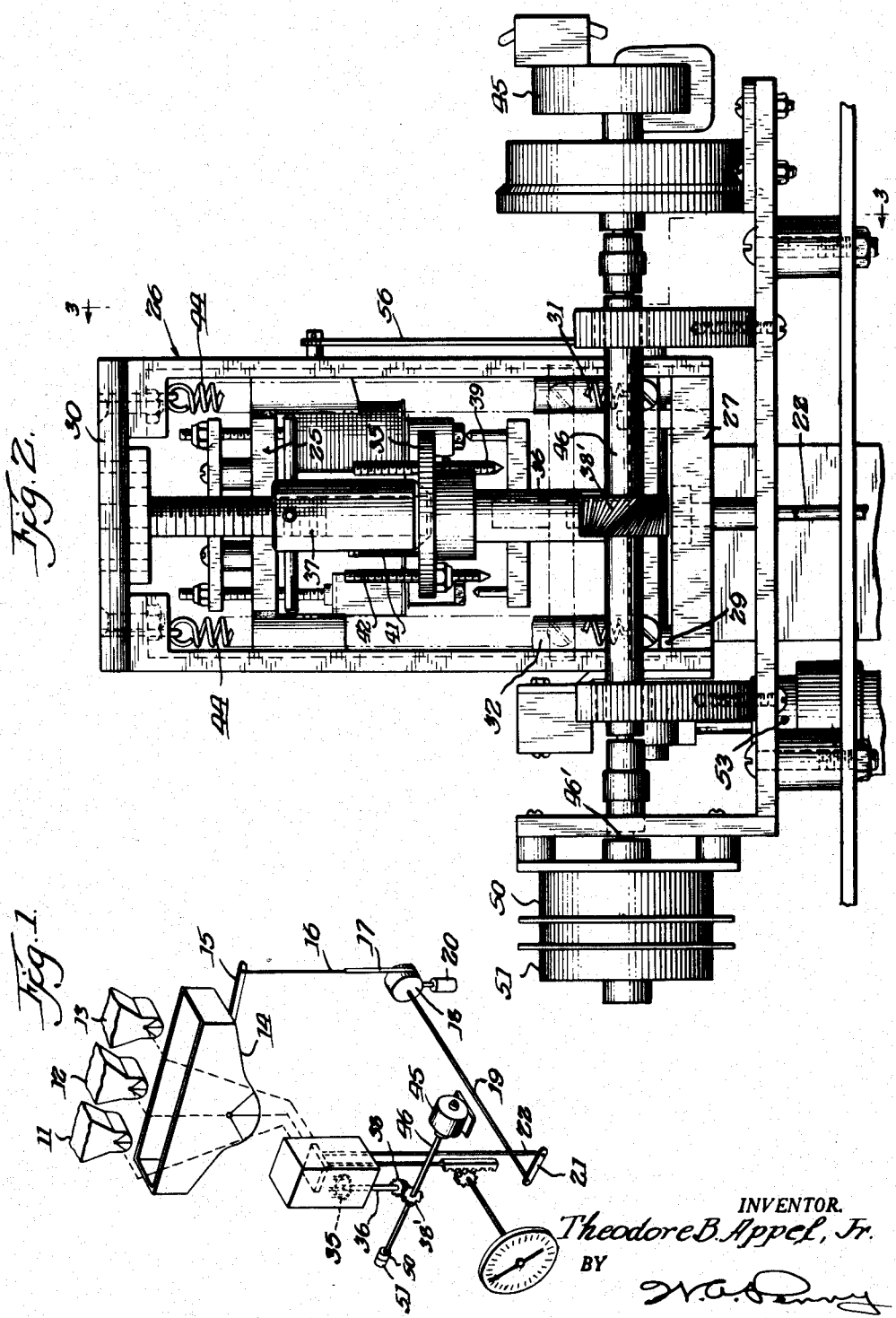

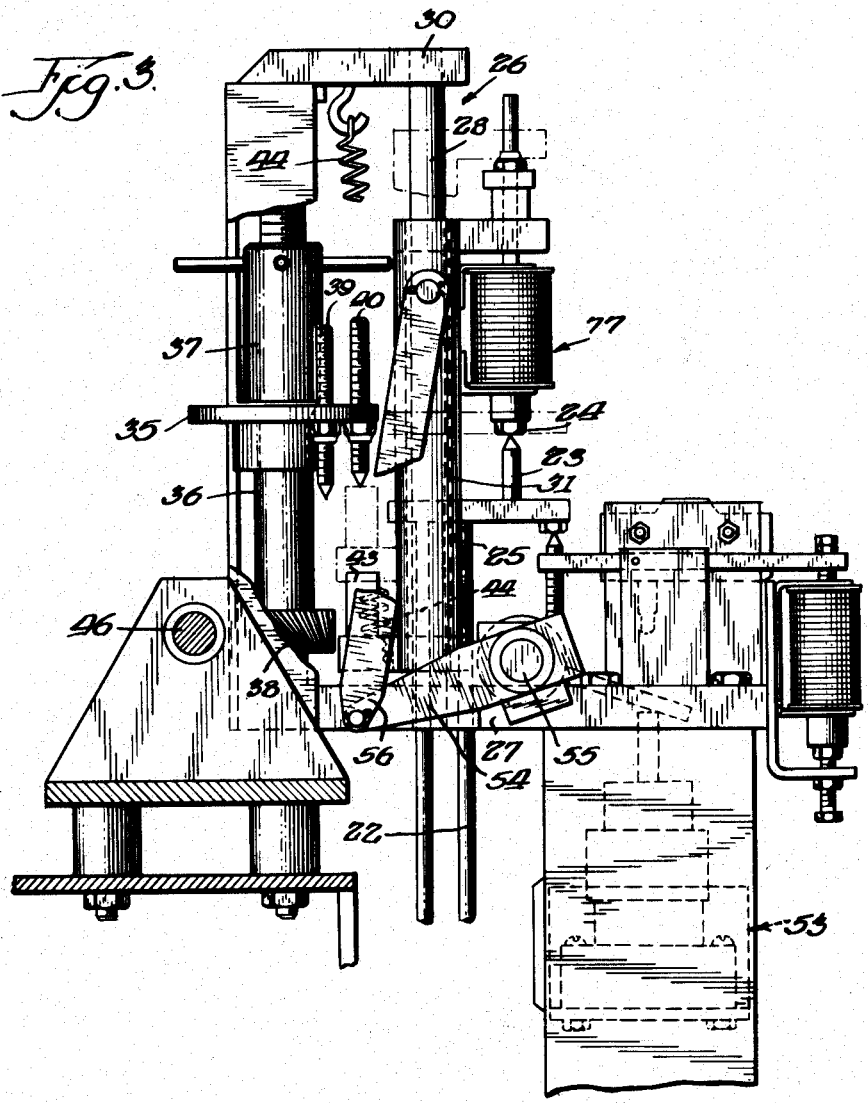

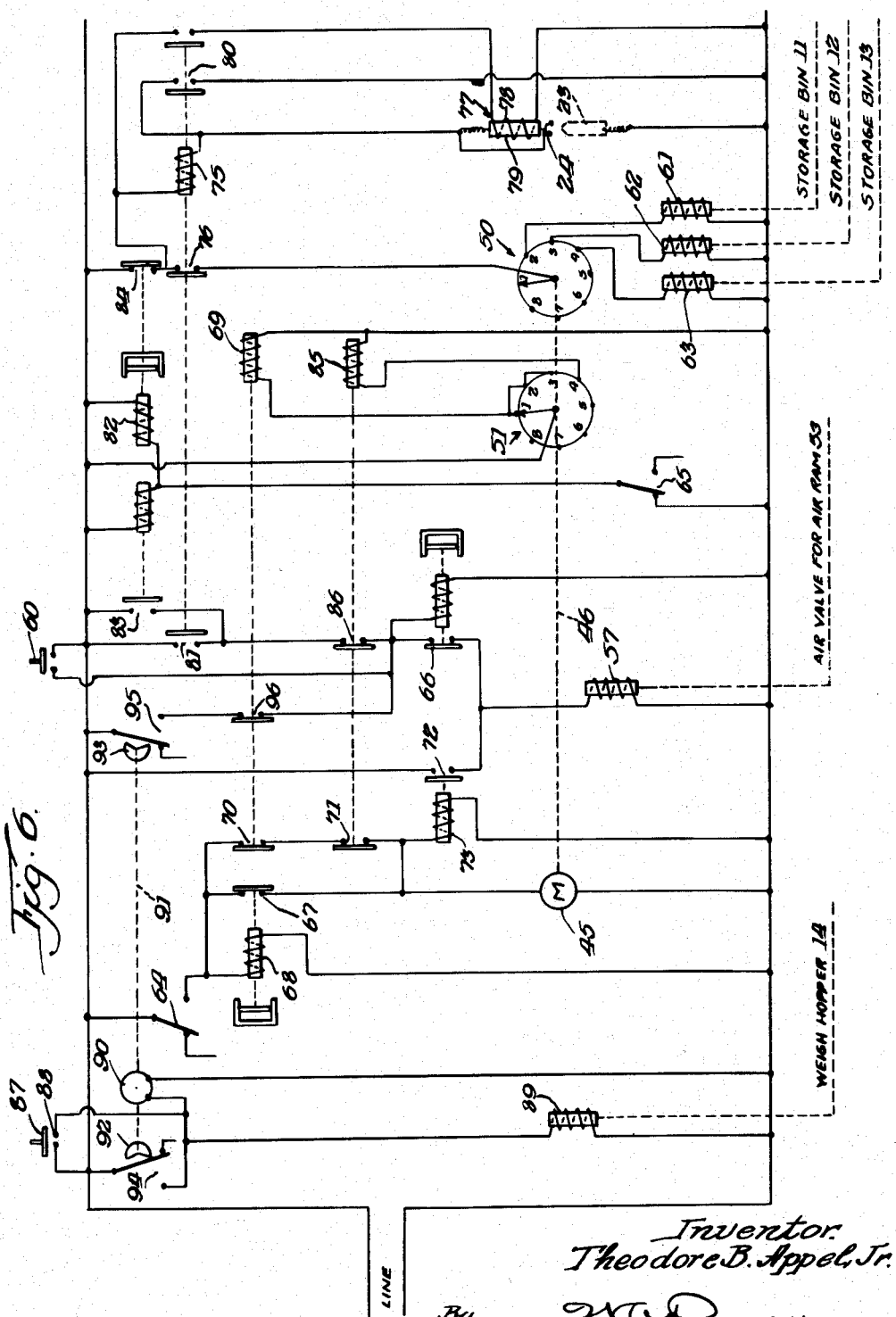

United States Patent Office
3,002,575
Patented Oct. 3, 1961

3,002,575
MULTIPLE MATERIAL BATCHER CONTROL
Theodore B. Appel, Jr., Champaign, Ill., assignor, by mesne assignments, to Koehring Company, Milwaukee, Wis., a corporation of Wisconsin
Filed Mar. 5, 1956, Ser. No. 569,317
10 Claims. (Cl. 177—70)

The present invention relates to multiple material batchers as employed particularly in batching materials for concrete.

In the prior United States Patent No. 2,559,307 issued to E. O. Martinson on July 3, 1951, there is disclosed a batcher of the so-called "single material" type in which a separate weigh hopper is provided in connection with individual storage bins one each for the various materials. In the system disclosed in the aforesaid patent, separate cut-off mechanism associated with each of the respective storage bins is used to cut off material flow after a predetermined weight of material has been received in the respective weigh hopper.

Multiple material batchers to which the present invention is directed, are arranged differently, in that only a single weigh hopper is employed, the storage bins all depositing into this sole weigh hopper. Furthermore, such batchers are sometimes termed "cumulative" batchers, in that the scale associated with the weigh hopper is used to weigh the accumulated materials received therein.

It is a general object of this invention to provide a control mechanism for multiple material batchers affording automatic batching of diverse bulk materials from a plurality of individual storage bins.

It is a more specific object to provide a power actuated control mechanism operating in association with the weigh hopper scale, and arranged to travel through a cycle during which a predetermined amount of each of the different materials is successively weighed out from the various storage bins, the accumulated weight of material in the weigh hopper effecting through control instrumentalities the successive batching operations.

It is another object of the present invention to provide an electrical control circuit for effecting the successive batching operations by automatically opening and closing the fill gates of the various storage bins in succession. It is a related object to provide a batcher control both sensitive and precise and affording a high order of weighing accuracy, yet rugged, and relatively free from service problems, thus being adaptable for use in the dust laden environment peculiar to concrete mixing installations.

Further objects and advantages will become apparent from the following description, taken together with the accompanying drawings, wherein:

FIGURE 1 is a diagrammatic perspective of a multiple material batcher control constructed in accordance with the present invention;

FIG. 2 is a front view showing the power actuated switch mechanism embodied in the batcher control illustrated in FIGURE 1;

FIGS. 3 and 4 are side and rear views respectively, of the device shown in FIG. 2;

FIG. 5 is a detailed perspective view of a rotatable turret and mounting therefor embodied in the device shown in FIG. 2; and FIG. 6 is a schematic diagram of the control circuit showing the manner in which it is coupled to the device illustrated in FIG. 2, and to the discharge gates of the storage and weight hoppers.

Although the invention is shown and described in some detail with reference to a particular embodiment thereof, there is no intention that it thus be limited to such detail. On the contrary, it is intended to cover all modifications, alternative constructions and equivalents falling within the spirit and scope of the invention as defined by the appended claims.

Referring now to the drawings, FIGURE 1 shows a multiple material batcher control embodying the present invention. This figure, which diagrammatically depicts the arrangement in order to facilitate understanding illustrates three storage bins 11, 12, 13 provided for three separate bulk materials, for example cement, sand and gravel. These three storage bins are so arranged in the installation with relation to a weigh hopper 14 as to allow flow of material therefrom into the weigh hopper and in the present arrangement by means of the batching control of this invention, the different materials are automatically and successively batched into the weigh hopper, the amount of material released from each of the storage bins being regulated in accordance with the particular mix desired.

Associated with the weigh hopper or weighing scale 14, is a scale beam 15 and a cable 16. The end of the cable 16 is connected to a draft band 17 which is wound about a drum 18, the latter being mounted on a shaft 19 journaled in suitable bearings. Rigidly connected to the shaft 19 is a pendulum weight 20 which counterbalances the weight of the material in the weigh hopper 14.

By means of the control of the present invention, fill gates for the individual storage bins 11, 12, 13 are successively opened and closed automatically in accordance with the weight of material required from the respective storage bins in relation to the accumulated weight of material in the weigh hopper as registered on the weighing scale. The cut-off for the fill gates is effected by the weighing scale mechanism, by means of a linkage which, in the present instance, includes a crank 21 and a push rod 22. Coupled to the upper end of the push rod 22 is a control element 23 (FIG. 3) which moves vertically in accordance with the weight of material on the weighing scale. In the present instance, and as shown in FIGS. 2–4, the control element 23 is adapted for engagement with a cut-off control element 24 carried by a carriage 25 vertically slidable on a frame 26, the control elements as shown being in the form of electrical contacts. In the construction and arrangement illustrated, the frame 26 on which the carriage is mounted for vertical movement, includes a base plate 27 supporting posts or guard rails 28, 29 topped by a bridge plate 30, while the carriage 25 includes tubular side members 31, 32 telescoped over the posts or guard rails 28, 29 so that the carriage may be freely positioned vertically with respect to the frame.

In the exemplary illustration of the invention, means are provided for positioning the cut-off control element 24 at a series of selectable vertical locations each corresponding to a respective material contained in one of the storage bins and in accordance with the predetermined weight of material required from the respective storage bin in relation to the accumulated weight of material on the weighing scale. These series of selectable locations for the cut-off control element determine the proportions of the various materials of a mix and may be termed reference positions and are obtained by locating the carriage 25 at different predetermined vertical locations. For locating the carriage, a rotatable turret 35 is used mounted on a vertical shaft 36 which is journaled in the frame 26. Referring to FIG. 5, it will be seen that the turret 35 is mounted for rotation with the shaft 36, and is fixed vertically by means of a turret nut 37 threaded on an upper portion of this same shaft. The upper portion of the shaft 36 is of somewhat reduced diameter with relation to the lower portion bearing the turret 35 in order to permit the turret to be removed. At its lower end, the shaft 36 carries a pinion 38 for meshing with a pinion 38' carried on a power actuated shaft and used for turning the turret. Spaced at equal intervals about the turret 35 are adjustable stop pins, four of these pins being indicated for convenience at 39, 40, 41 and 42. Suitable lock nuts are provided for anchoring the pins in a desired position of adjustment. By rotating the turret 35 the stop pins may be advanced one by one into an active position over the carriage 25, when in such position serving as a vertical stop for the carriage.

For seating against a selected stop pin, the carriage 25 carries a block 43, the carriage being pulled upwardly into a seated position where the block 43 bears against the stop pin by means of tension springs 44. It will be apparent that with the turret 35 in a given rotatable position, the carriage 25 is maintained at a precise elevation which is determined by the adjustment of the respective stop pin in the turret.

In the present arrangement, four stop pins are carried by the turret 35 arranged in succession, the first (39) corresponding to a zero position of the turret and carriage and each succeeding stop pin corresponding to one of the various bulk materials contained in a respective storage bin. All but the zero position stop pin are set in accordance with a predetermined weight of material required from the respective storage bin in relation to the accumulated weight of material on the weighing scale. Accordingly, the second stop 40 is adjusted to automatically weigh out a predetermined amount of the material contained in the respective storage hopper 11. Similarly the third stop pin 41, and the succeeding stop pin 42 are adjusted to batch or weigh out material from the storage bin 12 and the succeeding storage bin 13 when the weight on the scale equals the weight of the first material received by the weigh hopper plus a predetermined weight of a second material received from the second storage bin, and similarly for the succeeding storage bin 13.

In order to bring about the successive batching operations automatically, the batcher control embodies a control circuit effecting the required operations.

In accordance with the present invention, the control circuit incorporates power actuated means for cycling certain of the control instrumentalities of the circuit and as well for operating the turret 35. In the present instance, the power actuation is provided by a drive motor 45 (FIG. 1) connected in drive relation with the shaft 46 employed for rotating the driveshaft 36 and the turret 35, and also employed for operating in conjunction therewith control instrumentalities in the form of selector switches 50, 51.

Briefly stated, the control circuit when once energized, effects a cycle of operation during which a predetermined weight of material from each of the storage bins is received by the weighing scale. During this cycle of operation, the motor 45 is intermittently energized for rotating the turret 35 to position successively the different stop pins for engagement with the carriage 25. The motor is de-energized as each of the stop pins carried by the turret reaches a position for engagement with the carriage and is re-energized for turning the turret to bring the next succeeding stop pin into operative relation with the carriage by means responsive to the touching of the control elements 23, 24, which action is also effective for cutting off flow of the particular material then being batched.

To prevent interference between the turret stops and the carriage 25 when the turret is rotated, means are provided for retracting the carriage downwardly away from the turret. In the present instance, an air ram 53 retracts the carriage, acting through a crank 54, a horizontal shaft 55 on which the crank pivots and a connecting link 56 fastened to the side member 30 of the carriage 25. The air ram 53 is controlled by an air valve driven by a solenoid actuator 57 embodied in the illustrative control circuit. Thus when the connecting link 56 is drawn down by means of the air ram 53 and the crank 54 (FIG. 3), the carriage 25 is also pulled downwardly against the force of the springs 44. After the carriage 25 has been lowered the turret may be rotated without interference to advance a stop pin into active position.

In carrying out the invention, a first pair of control elements 23, 24 (as described hereinbefore) is employed for producing final cut-off of material flow from a respective storage bin. As shown in FIG. 4, a second pair of control elements 58 carried respectively on the upper end of the push rod 22 and the carriage 25 may be used for major cut-off, that is partial closing of the fill gate of the respective storage bin, prior to final cut-off in order to more precisely weigh out a predetermined amount of material. Similarly, a third pair of control elements 59 may be carried in a similar manner, providing for indicating by means of a signal light or the like when an amount of material in excess of the predetermined weight has been weighed out during the batching operation. For purposes of convenience, the arrangement of the different control elements is as shown in FIG. 4, the final cut-off control being provided by the left hand control elements, major cut-off control by the center elements, and over-weight control by the right hand elements. This may be varied as desired, and in fact in the present instance, the control circuit and instrumentalities will be described in connection with only the final cut-off control elements 23, 24, this simplification being used for purposes of clarity. It should be understood, however, that although no later mention will be made of the major cut-off control and over-weight control as embodied in the control circuit, such may be incorporated as desired.

To understand the circuit used to control flow of material, or batching of the various bulk materials contained in the different storage bins, reference is made to FIG. 6. In this figure the vertically movable weight responsive control member 23 is indicated by dot-dash outline and is arranged below the vertically adjustable cut-off control element 24. In the present instance, the cut-off control element 24 comprises an electrical contact as does the weight responsive control element 23, and forms a part of the control circuit. It will be understood that this arrangement in forming a switch is exemplary only, and may be replaced by any well known conventional switch means.

Operation of the control circuit is initiated by a pushbutton 60 which may be mounted on a panel control board or the like provided for a cabinet housing the control circuit and instrumentalities.

The output of the control circuit serves to energize selectively a suitable actuator to open the fill gate of each of the respective storage bins 11, 12, 13, by means of solenoids 61, 62, 63 adapted to be individually energized, and in the order in which the different materials are to be batched to the weigh hopper 14. For convenience in description, it will be assumed that the various materials are batched consecutively in the order of the respective storage bins 11, 12 and 13.

With a circuit arranged as illustrated in FIG. 6, the selector switch 50 is employed for energizing the solenoids 61, 62, 63 and opening the fill gates of the different storage bins. This selector switch 50 is coupled for rotation with the shaft 46 driven by the motor 45, and as shown in FIG. 2 is connected thereto by means of a shaft 46. The fill gates for the various storage bins are closed by means responsive to touching of the weight responsive control element 23 and the cut-off element 24.

With the circuit arranged as shown where the selector switches 50, 51 are set as indicated, and the turret 35 is indexed to position the first or zero stop pin 39 over the carriage 25, the control mechanism is zeroized and conditioned to begin a batching cycle. In the zero position the selector switch 50 assumes a stage one or upright position where the circuits to the solenoids 61, 62, 63 are all open and the fill gates of the storage bins are all closed. In response to closing the pushbutton 60 contacts, after a short lapse during which the carriage 25 is lowered out of engagement with the turret 35, the circuit to the motor 45 is closed, energizing the motor and rotating the switch 50 clockwise to stage two position in order to close the circuit to the solenoid 61.

In accordance with the present invention, the selector switch 50 is advanced through the consecutive stages thereof by intermittent energization of the motor 45. De-energization of the motor 45 after it has once been energized to stop the selector switch 50 at the various stages is effected by means of the additional selector switch 51 which is coupled for rotation therewith. This additional selector switch 51 is an eight-stage switch like the selector switch 50, the various stages of both switches being angularly coincident.

To retract the carriage 25 and lower the carriage out of interfering relation with the turret 35 and the stop pins borne thereby, to allow rotation of the turret, as described hereinbefore, an air ram 53 is employed connected through a linkage to the carriage itself. The air ram 53 is actuated by means of an air valve actuated by the solenoid 57 embodied in the control circuit. Connected to the carriage 25 are two limit switches 64, 65, the first of which is closed only when the carriage 25 is in its fully lowered position, and the second of which is open only when the carriage 25 is up tight against a stop pin carried by the turret 35. These limit switches 64, 65 cooperate with certain of the control instrumentalities embodied in the circuit, to control the periods during which the motor 45 is energized and turns the selector switches 50 and 51 and rotates the turret 35 to index the stop pins, also controlling energization of the circuit to the solenoid actuators 61, 62, 63 for the fill gates of the various storage bins.

Accordingly, with the arrangement as shown in FIG. 6, to effect commencement of the control cycle the push button 60 is closed thereby closing the circuit to the solenoid 57 through normally closed contacts 66. This causes, respectively, admission of air to the air ram 53 and lowering of the carriage 25 away from the turret 35. Upon the carriage 25 reaching its lowermost position the limit switch 64 is closed from its normally open position as indicated in FIG. 6 in which position the circuit to the motor 45 is also open. Closing the limit switch 64 energizes the motor 45 through normally closed contacts 67 controlled by a delay relay 68. The delay relay 68 serves to hold the relay contacts 67 closed until the normally closed contacts 70 of the relay 69 are closed responsive to the selector switch 50 swinging off the stage one position. The delay relay 68 drops out after this predetermined period of time has elapsed, whereupon the motor 45 is energized through the relay contacts 70 and the also normally closed relay contacts 71.

Energization of the motor 45, in addition to resulting in rotation of the selector switches 50 and 51, also is effective to rotate the turret 35. Accordingly, coincident with the advancement of these selector switches the turret rotates to bring a succeeding stop pin (in this case the stop pin 40) into active position over the carriage 25. The carriage 25 is maintained lowered during rotation of the turret 35 by means of a holding circuit for the air valve solenoid 57 and including the relay contacts 72 which are closed in response to energization of the relay 73, the latter being effectively in circuit with the motor 45. De-energization of the motor 45 is effected, to locate the stop pin 40 over the carriage 25 and to open the fill gate for the first storage bin 11 as was described hereinbefore, as an incident to the selector switch 51 reaching the stage two position. This is brought about by means of the relay 69, which in the stage two position of the selector switch is in circuit, and operates to open the relay contacts 70. Simultaneously therewith, the relay 73 is dropped out of circuit and its contacts 72 opened, thereby opening the holding circuit to the solenoid 57, closing the air ram 53 to the source of pressure fluid and allowing the carriage 25 to return vertically toward the now stationary turret 35 under the action of the tension springs 44.

Upon the carriage 25 reaching the uppermost position tight against the respective stop pin (40) on the turret 35, the limit switch 65 opens, as described previously, to close the circuit to the selector switch 50 and also the circuit to the control elements 23, 24. This latter circuit includes the control elements 23, 24 and the relay 75. As the flow of material from the storage bin 11 accumulates in the weigh hopper 14, by means of the scale mechanism the push rod 22 gradually rises, elevating the weight responsive control element 23 toward the cut-off control element 24. After a predetermined weight of material has been deposited, the control elements touch thereby closing the circuit to the relay 75, its contacts 76 in the circuit of the selector switch 50, and by means of the solenoid actuator 61 effecting cut-off of the flow of material.

In the arrangement illustrated, means are provided not only for cutting off flow of material upon touching of the control elements 23 and 24, but also for retracting the element 24 into an out of the way position. As shown, this retraction is brought about by a solenoid 77 having a winding 78 and a vertically movable armature 79 on which the contact element 24 is mounted. The solenoid 77 is anchored to the carriage 25 as shown in FIG. 3, axially aligned with control element 23. Upon touching of the control elements the solenoid winding 78 is energized causing the armature 79 to be drawn upwardly out of the effective range of the weight responsive movable control element 23. It will be observed that momentary touching of the control elements energizes the solenoid winding 78. This touching of the control elements also closes the relay 75 as described previously, closure of the relay contacts 80 causing this relay to be "locked in." The relay 75 is also effective to open relay contacts 76 which are connected in the circuit to the solenoid actuator 61 driving the fill gate for the storage bin 11, de-energizing this circuit and effectively closing this fill gate. Until the relay contacts 76 are opened by the relay 75, it will be noted, the fill gate of the storage hopper 11 remains open and during this period the bulk material from the storage bin 11 flows into the weigh hopper. Thus the relay 75 in response to engagement of the control elements 23, 24 effects closure of the fill gate of the respective storage hopper.

Simultaneously with opening the circuit to the selector switch 50 and the fill gate solenoid actuators, the relay 75 closes the circuit to the solenoid actuator 57 of the air valve by means of relay contacts 81. Air under pressure is then admitted to the air ram 53 and the carriage 25 is lowered away from engagement with the turret stop pins. As the carriage moves away from the turret stop pins, the limit switch 65, as previously described, automatically closes. This energizes the time delay relay 82 which after a time lapse long enough to allow the relay contacts 83 to close and energize the circuit to the air valve solenoid actuator 57, opens the relay contacts 84 thereby opening the circuit to the control elements 23, 24 and including the relay 75.

After the carriage 25 reaches its lowermost position, the motor 45 is energized as described hereinbefore, turning the selector switches 50 and 51 toward the stage three position and coincident therewith rotating the turret 35 to bring a next succeeding stop pin (41) into active position or operative relation above the carriage. When the turret has rotated sufficiently to bring the next succeeding turret pin into an active position, the motor 45 is de-energized by means responsive to the selector switch 50, the carriage 25 is then elevated into abutting relation therewith, and by means of selector switch 50 and the limit switch 65 the solenoid actuator 62 for the respective storage bin 12 is actuated to open the fill gate of the said storage bin. After a predetermined weight of material has been batched the sequence of operations are repeated to weigh out material from the storage hopper 13.

In the present instance three storage bins are illustrated as embodied in the multiple material batcher installation of FIG. 1. Accordingly, following the batching of the material contained in the final storage bin 13, means are provided for zeroizing the control.

At the completion of this last batching operation, selector switch 50 is positioned at stage four at which position, preliminary to zeroizing, the circuit is conditioned for discharging the weight hopper 14. Thus, the present control circuit provides for discharging the weight hopper and automatically returning the control mechanism to a zero position ready for a new cycle. Accordingly, means are provided for effecting as an incident to the selector switch 50 reaching the stage four position, opening of the circuit to the motor 45 to prevent the motor from being energized and the circuit from cycling through another batching operation. In the present instance this is brought about by the relay 85 which opens both the circuit to the motor 45 by way of contacts 71 and as well the circuit to the air valve solenoid actuator 57 by way of contacts 86. This action effectively holds the control circuit ready for discharging the weight hopper and for zeroizing.

To discharge the weight hopper, push button 87 is depressed, this push button being located on the panel or control board as in the manner of the automatic batching pushbutton 60 previously described. Closing the pushbutton contacts 88 closes the circuit to the solenoid actuator 89 controlling the discharge gate of the weight hopper 14. Simultaneously therewith, the circuit to a program timer 90 is also closed for zeroizing the control assembly. The program timer 90 is of conventional construction and includes a rotatable armature coupled for rotation with a shaft 91 turning cam banks 92, 93, and actuating switches 94, 95. These switches are employed for holding closed the circuit to the program timer and to the solenoid actuator 89 for the discharge gate of the weight hopper 14 a predetermined period of time sufficient to allow the weight hopper 14 to empty. In the zeroizing operation, rotating the shaft 91 by means of the program timer 90 closes the switches 94, 95, the switch 95 automatically closing the circuit to the air valve solenoid 57 through normally closed relay contacts 96 and delay relay contacts 66. Accordingly, the air ram 53 is actuated to lower the carriage 25 away from the turret 25, the delay relay contacts 66 remaining closed until the carriage has reached its lowermost position. The carriage upon reaching this position closes the limit switch 64 thus energizing the circuit to the motor 45 and also the circuit to the relay 73. Energizing this relay closes the relay contacts 72, as previously described, and holds the circuit to the air valve solenoid 57 closed.

The motor 45 being energized, turns the shaft 46 rotating the turret 35 and also selector switches 50 and 51 toward their zero position as shown in FIG. 6. Stages 5, 6, 7 and 8 are passed without initiating any change in the control circuit. The circuit to the motor 45 is automatically de-energized upon the selector switch 50 reaching the stage one position by means of the relay 69 which is energized in the zero position of the selector switch (stage one) and which effects opening of the relay contacts 70 in the motor circuit.

The program timer 90 simultaneously rotates to return the cam bank controlling the switches 94, 95 to its initial position, as mentioned above, closing the discharge gate of the weight hopper 14 as an incident to completing the cycle of rotation. Here it will be noted that the limit switch 64, closed only in the lowered position of the carriage, holds the circuit to the motor 45 and the circuit to the solenoid 57 controlling the elevation of the carriage 25, closed to permit the continued rotation of the motor and zeroizing of the turret 35 and the selector switches 50 and 51. Upon reaching the stage one or zero position the selector switch 50 by means of the relay 69 is also effective to open the circuit to the solenoid 57. The carriage 25 under the urging of the tension springs 44 then rises toward the turret, which in the present instance is provided with the zero stop pin 39 against which the carriage abuts, in this pre-batching or zero stage of the control.

The control mechanism of the present invention is then zeroized and ready for a new batching cycle.

As described hereinbefore, the turret 35 is held on the driveshaft 36 therefor by means of a turret nut 37. To change the mix, it is preferred that the turret be removed by unscrewing the turret nut, and the turret replaced by a new and different turret having stop pins set for the predetermined weights of the various materials required for the new mix. Replacing the turret entirely, rather than adjusting individual stop pins, is an operation which may easily be carried out by an unskilled operator, although the latter is contemplated. It will readily be observed, however, that the individual stop pins of a turret installed in position may easily be adjusted should the mix proportions vary from the desired proportions to any degree.

In addition to the control instrumentalities embodied in the control circuit as shown in FIG. 6, it is contemplated that the control circuit may be modified as will be apparent to a man skilled in the art, to include a major cut-off, operated by the major cut-off control elements 58 illustrated in FIG. 2, and as well to include an over-weight control circuit operable by the over-weight cut-off elements 59 also shown in this same figure.

Other modifications and additions to the control circuit shown, may be effected, as required by the particular installation. Thus additional stop pins may be incorporated in the turret 35 at the blank stages thereof and circuits included for operation by the selector switch 50 and 51 in the corresponding unwired stages thereof. Thus the control of the present invention is capable of batching more or fewer than the number of storage hoppers illustrated as exemplary in FIGURE 1 and as embodied in the control circuit shown in FIG. 6.

I claim:

1. In a multiple material batcher having a weighing scale and a plurality of storage bins, control means for batching material contained in said storage bins, said control means comprising in combination, a weight responsive control element coupled to said weighing scale and arranged for movement therewith, a movable carriage, a cut-off element carried by said carriage and adapted to be engaged by said control element, a turret having a plurality of stops each corresponding to a respective one of the storage bins and each being adjusted in accordance with a predetermined weight of material to be deposited from the said respective storage bin, a drive motor for said turret, means for energizing said drive motor for advancing said turret and said stops successively into operative relation with said carriage whereby to provide a series of selectable locations for said carriage and said cut-off element, means for separating said carriage from relation with said turret during advance movement of the turret to prevent interference therebetween, means operative as an incident to one of said stops reaching operative relation with said carriage for initiating flow of material from the respective storage bin and for de-energizing said drive motor to cease further advance movement of the turret, and means responsive to the engagement of said elements for cutting off the flow of material and as an incident thereto, separating said carriage from relation with said turret and re-energizing said drive motor for continuing the advance of said turret to bring the next succeeding stop into operative relation with the carriage.

2. In a multiple material batcher having a weighing scale and a plurality of storage bins, control means for batching material contained in said storage bins, said control means comprising in combination, a weight responsive control element coupled to said weighing scale and arranged for movement therewith, a cut-off element adapted to be engaged by said control element, a turret having a plurality of stops each corresponding to a respective one of the storage bins and each being adjusted in accordance with a predetermined weight of material to be deposited from the respective storage bin, power actuated means for said turret, means for energizing said power actuated means for advancing said turret to bring said stops successively into operative relation with said cut-off element to provide a series of selectable locations for said cut-off element, means operative as an incident to a one of said stops reaching operative relation with said cut-off element for initiating the flow of material from the respective storage bin and for de-energizing said power actuated means to cease further advance of the turret, and means responsive to the engagement of said elements after a predetermined weight of material has been deposited on the weighing scale for cutting off the flow of material from the respective storage bin and as incident thereto to re-energize said power actuated means for advancing the turret to bring the next succeeding stop into operative relation with the cut-off element.

3. In a multiple material batcher having a weighing scale and a plurality of storage bins, control means for batching material contained in said storage bins, said control means comprising in combination, a movable weight responsive control element coupled for movement with the weighing scale, a cut-off control element adjustable between fixed locations in the path of movement of said weight responsive control element and adapted to be engaged by the latter, said fixed locations each defining a control position for a predetermined weight of material to be deposited from the respective storage bin in relation to the accumulated weight of material on the weighing scale, means for successively positioning said cut-off control element at said locations, said positioning means having a series of selectable locations corresponding to the locations for the cut-off control element, a drive motor for advancing said positioning means between the selectable locations, a first selector switch moved by said drive motor in coincidence with said positioning means, said selector switch operating to stop said drive motor as each of the series of selectable locations is reached by the positioning means, a second selector switch moved by said drive motor in coincidence with said first switch, said second selector switch operating to initiate the deposition of materials successively from each of said storage hoppers, and means responsive to engagement of said control elements as an incident to the predetermined weight of material having been deposited on the weighing scale for cutting off flow of material from the respective storage bin and for re-starting said drive motor for advancing said positioning means to a next succeeding selectable location.

4. In a multiple material batcher having a weighing scale, a plurality of storage bins containing various materials to be batched, and a batcher control including a weight responsive control element, and a cut-off element adapted for engagement therewith, the combination comprising, power actuated means for establishing a series of selectable locations for said cut-off element each in accordance with a predetermined weight of material to be deposited from a respective storage bin in relation to the accumulated weight of material on the weighing scale, and a control circuit including a selector switch advanced by said power actuated means through successive stages corresponding to the selectable locations for said cut-off element, means operative as an incident to said cut-off element reaching each location for energizing said selector switch, means responsive to said selector switch reaching a given stage for opening the fill gate of the said respective storage bin to initiate the flow of material contained therein, and means responsive to the engagement of said weight responsive element and said cut-off element for closing the fill gate and cutting off the flow of material from the said respective storage bin.

5. In a multiple material batcher having a weighing scale, a plurality of storage bins each provided with power actuated fill gates for batching material contained therein onto the weighing scale, a weight responsive control element arranged for movement with said weighing scale, and a cut-off element adapted for engagement by said weight responsive control element, control means for batching material contained in said storage bins, said control means comprising in combination, power actuated means for establishing a series of selectable locations for said cut-off element each in accordance with a predetermined weight of material to be deposited from a respective storage bin, and a control circuit including said weight responsive control element and said cut-off element, a selector switch advanced by said power actuated means through successive stages corresponding to the selectable locations for said cut-off element, means operative as an incident to said cut-off element reaching each location for energizing said selector switch, means responsive to said selector switch reaching a given stage for opening the fill gate of the said respective storage bin to initiate the flow of material contained therein, and means responsive to the engagement of said elements for closing the fill gate and cutting off the flow of material from said respective storage bin.

6. In a multiple material batcher having a weighing scale, a plurality of storage bins each provided with fill gates for batching material onto the weighing scale, a weight responsive control element arranged for movement with said weighing scale, and a cut-off element adapted for engagement by said weight responsive control element, control means for batching material contained in said storage bins, said control means comprising a combination, power actuated means for establishing a series of selectable locations for said cut-off element each in accordance with a predetermined weight of material to be deposited from a respective storage bin in relation to the accumulated weight of material on the weighing scale, and a control circuit including a selector switch advanced by said power actuated means through successive stages corresponding to the selectable locations for said cut-off element, means operative as an incident to said cut-off element reaching each location for energizing said selector switch, means for actuating said individual storage bin fill gates, means responsive to said selector switch reaching a given stage for energizing said actuating means to open the fill gate of the said respective storage bin to initiate a batching operation, and means responsive to the engagement of said elements for de-energizing said actuating means to close the said fill gate and terminate the batching operation.

7. In a multiple material batcher having a weighing scale and a plurality of storage bins, control means for batching material contained in said storage bins, said control means comprising in combination, a weight responsive control element coupled to said weighing scale and arranged for movement therewith, a cut-off element adapted to be engaged by said control element, a plurality of stops each corresponding to a respective one of the storage bins and each being adjusted in accordance with a predetermined weight of material to be deposited from the respective storage bin, power actuated means for locating said stops in operative relation with said cut-off element, means for energizing said power actuated means for advancing said stops successively into operative relation with said cut-off element, to provide a series of selectable locations for said cut-off element, means operative as an incident to a given one of said stops reaching operative relation with said cut-off element for initiating the flow of material from the respective storage bin and for de-energizing said power actuated means to cease further advance of said stops, and means responsive to the engagement of said elements after a predetermined weight of material has been deposited on the weighing scale for cutting off the flow of material from the respective storage bin and as incident thereto to re-energize said power actuated means for advancing the next succeeding stop into operative relation with the cut-off element.

8. In a multiple material batcher having a weighing scale, a plurality of storage bins each provided with power actuated fill gates for batching material into the weigh hopper, a weight responsive control element arranged for movement with said weighing scale, a cut-off element adapted for engagement by said weight responsive control element, a turret having a plurality of stop pins corresponding to respective storage bins and adjusted in accordance with a predetermined weight of material to be deposited from the respective storage bins, said stop pins upon indexing of said turret being brought successively into operative relation with said cut-off element to provide a series of selectable locations for said cut-off element, control means for batching material contained in said storage bins, said control means comprising in combination, a motor for indexing said turret to bring said stop pins successively into operative relation with said cut-off element, power operated means for separating said cut-off element from operative relation with said turret during indexing thereof, and a control circuit including a first selector switch advanced by said motor coincident with said turret through successive stages corresponding to the selectable locations for said cut-off element, a second selector switch advanced by said motor with said first selector switch through like successive stages, means operative as an incident to said cut-off element reaching each location for energizing said selector switch, means responsive to said first selector switch reaching a given stage for opening the fill gate of the said respective storage bin to initiate a batching operation, and means responsive to the engagement of said elements for closing the said fill gate and terminating the batching operation and for energizing said power operated means for separating said cut-off element from operative relation with said turret, said second selector switch being effective upon reaching a successive stage thereof for de-energizing the power operated means.

9. In a multiple material batcher having a weighing scale, a plurality of storage bins, a weight responsive control element coupled to said weighing scale and arranged for movement therewith, a movable carriage, a cut-off element carried by said carriage and adapted to be engaged by said control element, control means for batching material contained in said storage bins, said control means comprising in combination, a replaceable turret having a plurality of stops each corresponding to a respective one of the storage bins and providing a series of selectable locations for said carriage, each of said stops being adjusted in accordance with a predetermined weight of material to be deposited from the respective storage bin to obtain a given mix proportion, said turret being replaceable to provide a plurality of stops adjusted in accordance with different predetermined weights of materials and obtaining a different mix proportion, power actuated means for advancing said turret whereby to locate said stops successively in operative relation with said carriage, means responsive to a given one of said stops reaching operative relation with said carriage for initiating batching of material from the respective storage bin, and means responsive to engagement of said elements for terminating the batching operation.

10. In a multiple material batcher having a weighing scale, a plurality of storage bins, a weight responsive control element arranged for movement with said scale, a movable carriage, a cut-off element carried by said carriage and adapted to be engaged by said weight responsive control element, control means for batching material contained in said storage bins, said control means comprising in combination, a replaceable turret having a plurality of stops each corresponding to a respective one of the storage bins and providing a series of selectable locations for said carriage, each of said stops being adjusted in accordance with a predetermined weight of material to be deposited from the respective storage bin to obtain a given mix proportion, a mount for said turret, means for securing said turret on said mount, said turret being replaceable upon removal of said securing means to provide a plurality of stops adjusted in accordance with different predetermined weights of materials and obtaining a different mix proportion, power actuated means for advancing said mount and said turret carried thereon whereby to locate said stops successively in operative relation with said carriage, means responsive to a given one of said stops reaching operative relation with said carriage for initiating batching of material from the respective storage bin, and means responsive to engagement of said elements for terminating the batching operation.

References Cited in the file of this patent

UNITED STATES PATENTS

| | | |
|---|---|---|
| 1,835,104 | Watson | Dec. 8, 1931 |
| 2,559,307 | Martinson | July 3, 1951 |
| 2,650,790 | Carliss | Sept. 1, 1953 |
| 2,659,563 | Saxe | Nov. 17, 1953 |
| 2,743,896 | Nauta | May 1, 1956 |